United States Patent [19]

Wyslotsky et al.

[11] 4,409,818
[45] Oct. 18, 1983

[54] SEAL TESTING DEVICE AND METHOD

[75] Inventors: Ihor Wyslotsky, Oakbrook Terrace; Franklin E. Baker, Jr., West Chicago, both of Ill.

[73] Assignee: Donald F. Shiff, Eden Prarie, Minn.

[21] Appl. No.: 351,122

[22] Filed: Feb. 19, 1982

[51] Int. Cl.³ ............................................. G01M 3/36
[52] U.S. Cl. ..................................................... 73/49.3
[58] Field of Search ............... 73/40, 40.7, 49.2, 49.3, 73/52

[56] References Cited

U.S. PATENT DOCUMENTS

| | | | |
|---|---|---|---|
| 3,805,595 | 4/1974 | Dobry | 73/49.3 |
| 3,973,249 | 8/1976 | Yokote | 73/49.3 |
| 4,187,798 | 2/1980 | Yoshimura | 73/49.3 |
| 4,205,551 | 6/1980 | Clifford | 73/49.2 |

FOREIGN PATENT DOCUMENTS 2351400  9/1977  France ................................ 73/493

Primary Examiner—S. Clement Swisher
Attorney, Agent, or Firm—Arnstein, Gluck & Lehr

[57] ABSTRACT

A device for testing the integrity and strength of a seal. The device includes a first enclosure member adapted to receive a pre-sealed package formed of two films joined together to form a continuous seal, the two films extending outwardly of the seal to define a marginal edge portion of the package. A second enclosure member adapted to cooperate with the first enclosure member upon demand is also provided to seal the marginal edge portion in spaced relation to the continuous seal of the pre-sealed package. The device also includes a fluid injection member adapted to cooperate with the first and second enclosure members by injecting a fluid between the two films after the marginal edge portion of the pre-sealed package has been sealed. An opening located outwardly of the continuous seal of the pre-sealed package and inwardly of the seal created by the first and second enclosure members is provided through which the fluid may be injected between the two films of the package. Additionally, the device includes a sensor located in proximity to the pre-sealed package to sense any passage of the fluid through the continuous seal into the pre-sealed package.

18 Claims, 8 Drawing Figures

SEAL TESTING DEVICE AND METHOD

BACKGROUND OF THE INVENTION

The present invention relates to a device and method for testing a seal and, in particular, to a device and method for testing the integrity and strength of a seal.

In the field of packaging, the use of materials such as thin plastic films has become a commonplace technique. In this type of packaging, the product to be packaged is oftentimes placed in one film, which may or may not be pre-formed into a desired shape, after which a second film is applied to the first film with a seal being formed between the two films. For instance, this type of packaging has been used extensively in the meat packaging industry, among many others. In this type of packaging, the product to be packaged is therefore oftentimes of a perishable nature, which may or may not require vaccum packing, but the seal must in any case have the requisite integrity and strength to withstand shipment and handling through the time of reaching the ultimate consumer. While the developments in such packaging have been significant, the need for effective devices and methods for the testing of seals has remained.

In this connection, there have previously been two principal techniques for the testing of seals. One technique utilizes laser beam scanning to identify and reject packages having a faulty seal caused by dirt or other impurities. Another technique is to inject a package with carbon dioxide prior to forming a seal. This technique utilizes a vacuum chamber into which a package may be placed to measure for carbon dioxide escaping through a defective seal caused by various packaging imperfections. While these techniques work to a limited degree, neither is completely satisfactory for a number of reasons.

Specifically, neither laser beam scanning nor carbon dioxide injection is entirely satisfactory as a seal testing technique. Laser beam scanning requires the use of extremely expensive equipment which, while effective for its intended purpose, does not have the requisite versatility required in package seal testing. For instance, while it is effective to detect impurities in a seal such as dirt and the like, other potential seal defects can escape detection utilizing this seal testing technique. Carbon dioxide injection also requires the use of extremely expensive equipment which, while again effective for its intended purpose, also does not have the requisite versatility required in package seal testing. In fact, neither laser beam scanning nor carbon dioxide injection is suitable for anything more than making a periodic check of package seals on a spot-check basis and, even then, the spot-check tests only the integrity, not the strength, of the seal of the relatively few packages tested.

Accordingly, it is an object of the present invention to provide a device and method for testing the integrity and the strength of a seal of a pre-sealed package.

Another object of the present invention is to provide a device and method of the type described which utilizes equipment which is relatively simple and inexpensive.

A further object of the present invention is to provide a device and method of the type described which utilizes equipment that is capable of operating on an assembly line basis.

An additional object of the present invention is to provide a device and method of the type described which utilizes equipment which employs mechanical principals of operation to test the seals of pre-sealed packages.

Still other objects, advantages and features of the present invention will become apparent from a consideration of the detailed description and illustration set forth in the accompanying specification, claims and drawings.

SUMMARY OF THE INVENTION

Accordingly, the present invention is directed to a device and method for testing the integrity and strength of a seal. The device includes first enclosure means adapted to receive a pre-sealed package formed of two films joined together to form a continuous seal, the two films extending outwardly of the seal to define a marginal edge portion of the package. A second enclosure means adapted to cooperate with the first enclosure means upon demand is also provided to seal the marginal edge portion in spaced relation to the continuous seal of the pre-sealed package. The device also includes fluid injection means adapted to cooperate with the first and second enclosure means by injecting a fluid between the two films after the marginal edge portion of the pre-sealed packaged has been sealed. An opening located outwardly of the continuous seal of the pre-sealed package and inwardly of the seal created by the first and second enclosure means is provided through which the fluid may be injected between the two films of the package. Additionally, the device includes a sensor located in proximity to the pre-sealed package to sense any passage of the fluid through the continuous seal into the pre-sealed package.

In a preferred embodiment, the fluid injection means includes a fluid injection portion disposed in an operative position in fluid communication with the opening in the one flim for injecting the fluid through the opening between the films to entirely surround the seals at a pre-selected fluid pressure. It also includes a fluid vacuum portion disposed in an operative position about the opening in the one film for drawing the one film away from the other of the films to permit injection of the fluid through the opening between the flims with the fluid injection portion. With this constructions, the fluid injection means further contemplates the fluid injection portion being operatively associated with a source of positive air pressure and the fluid vacuum portion being operatively associated with a source of negative air pressure.

Also, in a preferred embodiment, the sensor means is operatively associated with the upper enclosure means and is disposed in an operative position adjacent one of the two films within the boundary of the continuous seal of the pre-sealed package. The sensor means then advantageously includes a spring plunger mounted on the upper enclosure means and movable to a position contacting the one film when the upper and lower enclosure means seal the marginal edge portion of the pre-sealed package. Additionally, the sensor means includes indicator means operatively associated with the spring plunger to provide a perceptible signal in response to movement of the spring plunger after injection of the fluid through the opening between the films with the fluid injection means.

Moreover, the present invention is directed to a method for testing the integrity and strength of a seal. The method includes the step of providing a pre-sealed package formed of two films joined together to form a continuous seal and extending outwardly of the seal to define a marginal edge portion of the package. An opening is then provided outwardly of the continuous seal in one of the two films of the pre-sealed package. The method next includes the step of sealing the marginal edge portion in spaced relation to the continuous seal and outwardly of the opening in the one film of the pre-sealed package. A fluid is then injected through the opening in the one film after the marginal edge portion of the pre-sealed package has been sealed. Finally, the method includes the step of sensing any passage of the fluid through the continuous seal into the pre-sealed package.

DETAILED DESCRIPTION OF THE PREFERRED EMBODIMENT

Figure 1:
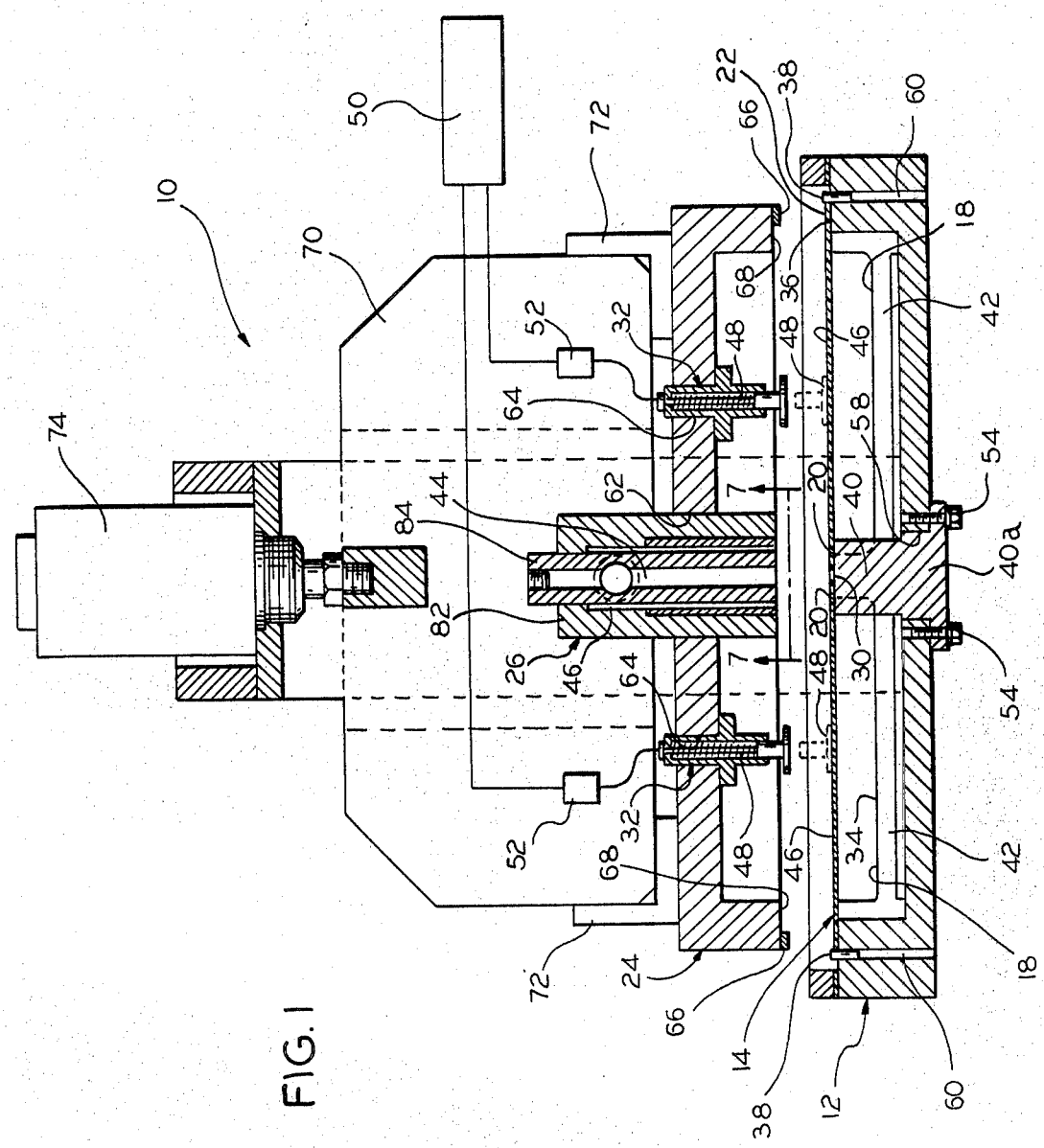
FIG. 1 is a sectional view illustrating a device for testing the integrity and strength of a seal in accordance with the present invention.
Figure 5:
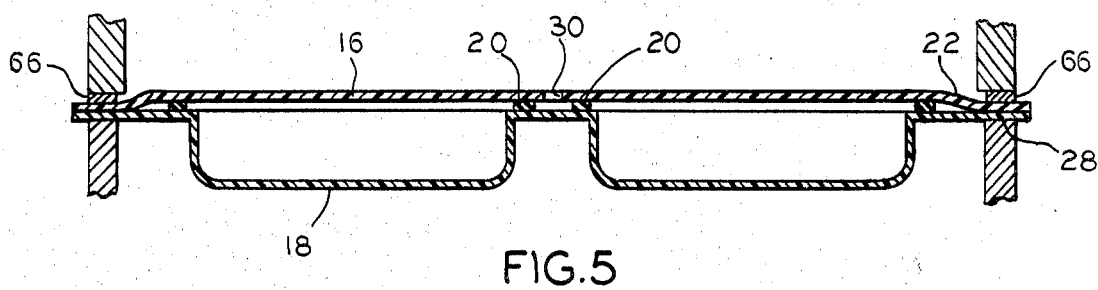
FIG. 5 is a front elevational view, partially schematic, of a pre-sealed package with the marginal edge portion sealed between an upper and lower die assembly.
Figure 6:
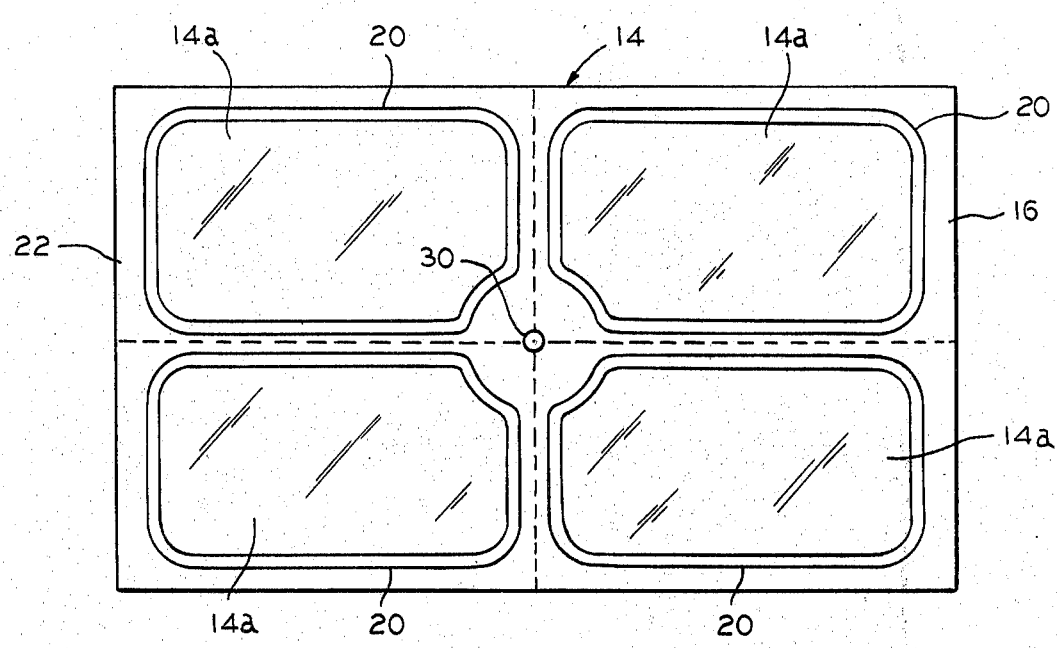
FIG. 6 is a top view of the pre-sealed package illustrated in FIG. 5.

In the illustrations given, and with reference first to FIG. 1, the reference numeral 10 designates generally a device for testing the integrity and strength of a seal. The device 10 includes first enclosure means, such as lower die assembly 12, adapted to receive a pre-sealed package 14 formed of two films 16 and 18 joined together to form a continuous seal 20, the two films 16 and 18 extending outwardly of the seal 20 to define a marginal edge portion 22 of the package 14 (see also FIGS. 5 and 6). A second enclosure means, such as upper die assembly 24, adapted to cooperate with the lower die assembly 12 upon demand is also provided to seal the marginal edge portion 22 in spaced relation to the continuous seal 20 of the pre-sealed package 14. The device 10 also includes fluid injection means, such as the fluid injection member 26, adapted to cooperate with the upper and lower die assemblies 12 and 24 by injecting a fluid, such as air, between the two films 16 and 18 after the marginal edge portion 22 of the pre-sealed package 14 has been sealed as at 28 (see FIG. 5). An opening 30 located outwardly of the continuous seal 20 of the pre-sealed package 14 and inwardly of the seal 28 created by the upper and lower die assemblies 12 and 24 is provided through which the air may be injected between the two films 16 and 18 of the package 14. Additionally, the device 10 includes a sensor 32 located in proximity to the pre-sealed package 14 to sense any passage of air through the continuous seal 20 into the pre-sealed package 14.

As shown in FIG. 1, the lower die assembly 12 includes a chamber 34 conforming to the pre-sealed package 14 so as to be able to receive the package therein. It will also be seen that the lower die assembly 12 includes a peripheral surface 36 surrounding the chamber 34 upon which the marginal edge portion 22 of the pre-sealed package 14 is disposed when the package is in the chamber 34. Preferably, the lower die assembly 12 also includes indexing means, such as locator pins 38, associated with the peripheral surface 36 which cooperate with the marginal edge portion 22 for positioning the pre-sealed package 14 within the chamber 34. It will also be seen that the lower die assembly 12 includes package support means, such as vertical insert 40, disposed in the center of the chamber about which may be disposed a plurality of individually sealed packages 14a comprising the entire pre-sealed package 14. While not essential, it has also been found advantageous for the lower die assembly 12 to include one or more removable inserts 42 defining the chamber 34, the removable inserts 42 conforming to the pre-sealed package 14 and being replaceable by other removable inserts conforming to other pre-sealed packages.

Figure 8:
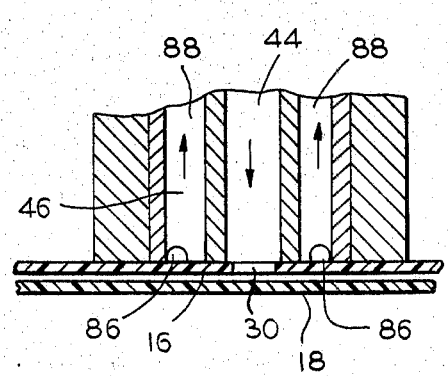
FIG. 8 is an enlarged sectional view of the fluid injection means, in an operative position, of the device illustrated in FIG. 1.

Referring specifically to FIG. 1, the fluid injection member 26 is operatively associated with the upper die assembly 24 and is disposed directly opposite the vertical package support insert 40. The fluid injection member 26 includes a fluid injection portion 44 disposed in an operative position in fluid communication with the opening 30 in the one film 16 for injecting air through the opening 30 between the films 16 and 18 to entirely surround the seals 20 and 28 at a pre-selected fluid pressure (see also FIG. 8). In addition, the fluid injection member 26 includes a fluid vaccum portion 46 disposed in an operative position about the opening 30 in the one film 16 for drawing the film 16 away from the other of the films 18 to permit injection of air through the opening 30 between the films 16 and 18 with the fluid injection portion 44.

As will be appreciated from the drawings the sensors 32 are operatively associated with the upper die assembly 24 and are disposed in operative positions adjacent the film 16 within the boundaries of the continuous seals 20 of the individual packages 14a. The sensors each include a spring plunger 48 mounted on the upper die assembly 24 and being movable to a position contacting the film 16 when the upper and lower die assemblies 12 and 24 seal the marginal edge portion 22 of the pre-sealed package 14. Additionally, the sensors 32 also include indicator means, such as a control panel 50, operatively associated with the spring plungers 48, e.g., through switches 52, to provide a perceptible signal in response to movement of one or more of the spring plungers 32 after injection of air through the opening 30 between the films 16 and 18 with the fluid injection member 26.

While the sensors 32 have been shown herein, it will be appreciated by those skilled in the art that a wide variety of sensors could be used for the intended purpose. Such sensors can range from the most simple kind of mechanical devices to sophisticated electronic equipment, with the only requirement being that the sensors used with the present invention be capable of sensing the passage of a fluid through the continuous seals into the individual packages comprising the pre-sealed package. Accordingly, it will be appreciated that the sensors 32 have been described solely by way of example and not limitation.

Referring to the details of construction illustrated in FIG. 1, the inserts 40 and 42 of the lower die assembly 12 may be fastened in position by appropriate fasteners such as the screws 54 and 56, respectively. Moreover, it will be seen that the lower die assembly 12 has a suitable centered opening 58 through which the vertical package support insert 40 may be inserted from the bottom and secured by means of the screws 54, which cooperate with a circular flange 40a on the bottom of the vertical package support insert 40. Also, the locator pins 38, which may, for example, be two or more in number, are disposed in appropriate holes 60 in press fit insert fashion.

As for the upper die assembly 24, it will be seen that it includes a centered opening 62 adapted to receive the fluid injector member 26. The upper dye assembly 24 also includes a plurality of openings 64, e.g., four in number in the present embodiment to correspond to the number of individual packages 14a comprising the pre-sealed package 14, which are adapted to receive the spring plungers 48. Moreover, the upper die assembly 24 includes a continuous peripheral seal 66 extending completely about the outer edge of the surface 68 in confronting relation to the surface 36 of the lower die assembly 12.

As will be appreciated, the seal 66 cooperates with the surface 36 to compress the two films 16 and 18 about the marginal edge portion 22 into tightly sealed relationship. This forms a temporary seal about the outer periphery of the pre-sealed package, as at 28 (see FIG. 5), and performs the function of allowing the air injected through the fluid injection portion 44 to completely surround the seals 20 (and the seal 23) at a pre-selected pressure. With this arrangement, the seals 20 can be tested not only for their integrity but also for their strength before the packages are shipped to a consumer.

Still referring to FIG. 1, the upper die assembly 24 may include one or more support flanges 70 joined to it by means of angle members 72. The support flange or flanges 70 (or the upper die assembly 24 itself) may then be joined, for example, to an air cylinder 74 or to any other commonly known expedient which will serve to raise and lower the upper die assembly 24 relative to the lower die assembly 12. Moreover, depending upon the assembly line operation in use, the lower die assembly 12 may be mounted so as to be stationary or movable toward and away from the upper die assembly 24.

Figure 2:
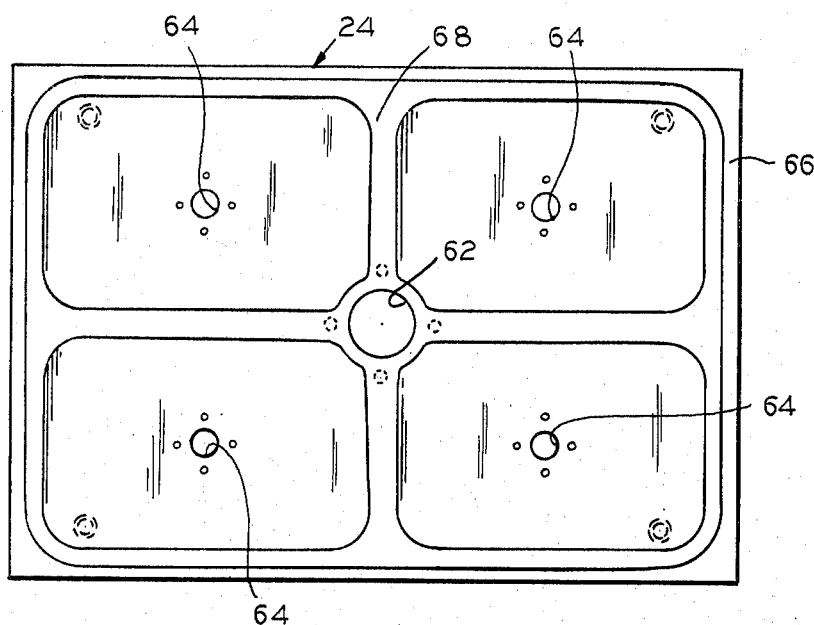
FIG. 2 is a bottom view of the upper die assembly of the device illustrated in FIG. 1.

Referring to FIG. 2, the relative locations of the fluid injection member 26 and the spring plungers 48 are clearly shown. This arrangement is, of course, dictated to some extent by the type of pre-sealed package 14 which has been chosen for purposes of illustrating the invention herein. Nevertheless, the spring plungers 48 will generally be disposed about the fluid injector member 26 so as to be centrally located over the individual packages (such as 14a).

In addition, FIG. 2 illustrates that the interior of the upper die assembly 24 may conform to the interior of the lower die assembly 12. This is optional, however, and it will be appreciated that the interior of the upper die assembly 24 may simply be a vacant chamber with the hole 64 for the spring plungers 48 simply being bored, as needed, in the proper locations through the upper die assembly 24 so as to be disposed centrally over the individual packages of whatever pre-sealed package is being tested with the device 10. Accordingly, the interior of the upper die assembly 24 may or may not conform to the interior of the lower die assembly 12, as desired.

Figure 3:
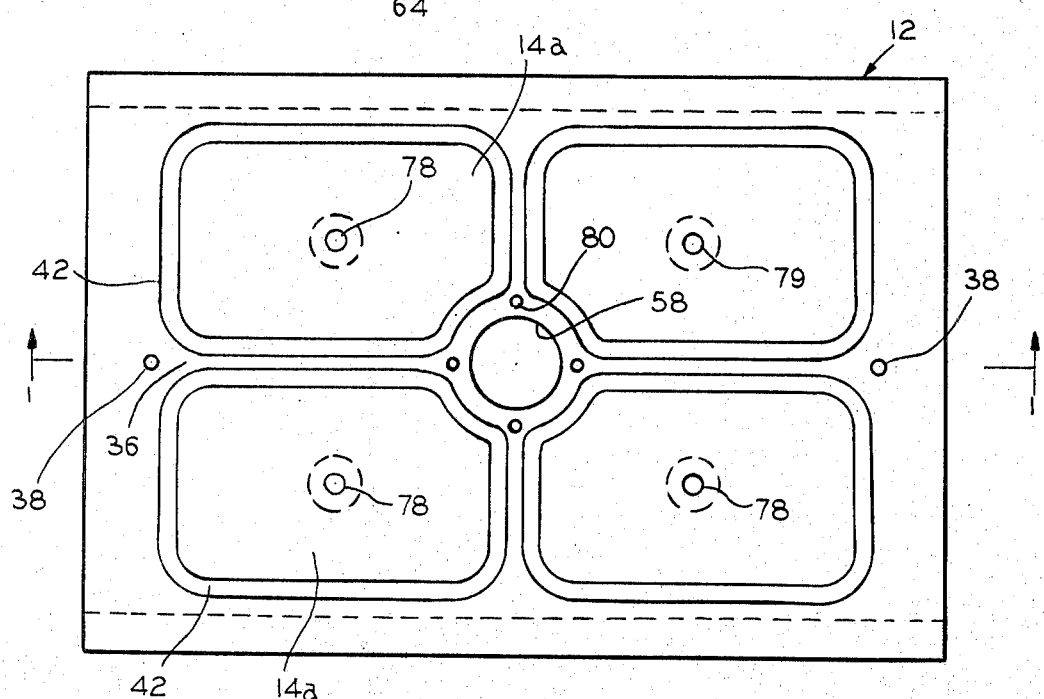
FIG. 3 is a top view of the lower die assembly of the device illustrated in FIG. 1.
Figure 4:
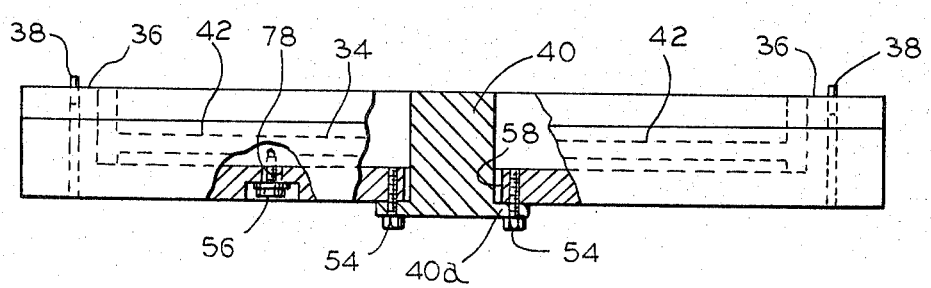
FIG. 4 is a front elevational view, partially in section, of the lower die assembly of the device illustrated in FIG. 1.

Referring to FIG. 3, the relationship of holes 78 and hole 58 is clearly shown. It will be appreciated, of course, that the holes 78 are provided in the lower die assembly 12 to receive the screws 56 that are used to secure the inserts 42 in place within the interior of the lower die assembly 12. As shown, the holes 78 are symmetrically arranged about the hole 58, as are the holes 80. It will be appreciated, of course, that the holes 80 are provided to receive the screws 54 adapted to secure the vertical package support insert 40 in position within the interior of the lower die assembly 12. With regard to the holes 78, however, the exact number and arrangement of such holes will depend entirely upon the exact number and arrangement of inserts for any particular pre-sealed package.

Figure 7:
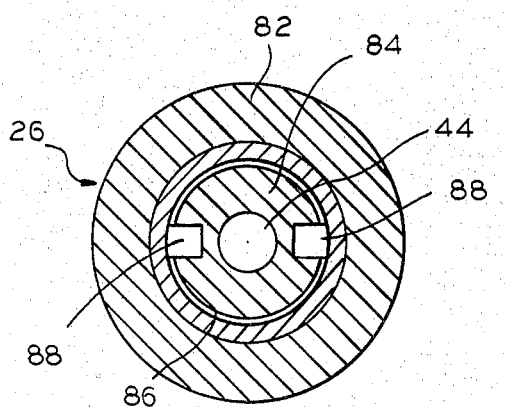
FIG. 7 is a bottom view of the fluid injection means of the device illustrated in FIG. 1.

Referring to FIG. 7, the fluid injection member 26 includes an outer cylindrical body portion 82, and an inner cylindrical insert 84 is also provided. The fluid injection portion 44 comprises an air nozzle operatively associated with a source of positive air pressure and the fluid vacuum portion 46, which includes a circumferential groove 86 at the bottom end thereof (see FIG. 8) and a pair of vertical channels 88 in radially opposed relationship and in communication with the groove 86, is operatively associated with a source of negative air pressure. With this arrangement, the negative air pressure creates a vacuum drawing the film 16 slightly away from the film 18 about the periphery of the opening 30, and the positive air pressure causes injection of air through the opening 30 to completely surround the seals 20 and the seal 28 at a pre-selected pressure.

With the present invention, a unique method for testing the integrity and strength of a seal has also been provided. The method includes the step of providing a pre-sealed package formed of two films joined together to form a continuous seal and extending outwardly of the seal to define a marginal edge portion of the package. An opening is then provided outwardly of the continuous seal in one of the two films of the pre-sealed package. The method also includes the step of sealing the marginal edge portion in spaced relation to the continuous seal and outwardly of the opening in the one film of the pre-sealed package. A fluid is then injected through the opening in the one film after the marginal edge portion of the pre-sealed package has been sealed. Finally, the method includes the step of sensing any passage of the fluid through the continuous seal into the pre-sealed package.

With the present invention, the integrity and strength of a seal can be tested with a method and device that are totally unique. This is accomplished by means which permit every package in an assembly line to be tested prior to shipment with relatively inexpensive and simple machinery that utilizes mechanical principals and operates extremely quickly and accurately to test not only the integrity but also the strength of a seal. Since this has previously been thought to be an impossibility, the present invention represents a significant advancement in the art of seal testing.

While the foregoing specification sets forth a detailed description of the preferred embodiment for purposes of illustration, the details herein given may be varied by those skilled in the art without departing from the spirit and scope of the appended claims.

We claim:

1. A device for testing the integrity and strength of a seal, comprising:

first enclosure means adapted to receive a pre-sealed package therein, said pre-sealed package being formed of two films joined together to form a continuous seal, said two films extending outwardly of said seal to define a marginal edge portion of said pre-sealed package;

second enclosure means adapted to cooperate with said first enclosure means upon demand to seal said marginal edge portion in spaced relation to said continuous seal of said pre-sealed package;

fluid injection means adapted to cooperate with said first and second enclosure means, said fluid injection means being operable to inject a fluid through an opening in one of said two films after said marginal edge portion of said pre-sealed package has been sealed between said first and second enclosure means, said opening being located outwardly of said continuous seal of said pre-sealed package and inwardly of said seal created by said first and second enclosure means; and sensor means located in proximity to said pre-sealed package to sense any passage of said fluid through said continuous seal into said pre-sealed package.

2. The device as defined by claim 1 wherein said first enclosure means is a lower die assembly and said second enclosure means is an upper die assembly.

3. The device as defined in claim 2 wherein said lower die assembly includes a chamber comforming to said pre-sealed package, said chamber being adapted to receive said pre-sealed package therein.

4. The device as defined in claim 3 wherein said lower die assembly includes a peripheral surface surrounding said chamber, said marginal edge portion of said pre-sealed package being disposed on said peripheral surface when said pre-sealed package is disposed in said chamber.

5. The device as defined by claim 4 wherein said lower die assembly includes indexing means associated with said peripheral surface, said indexing means for said peripheral surface being adapted to cooperate with said marginal edge portion for positioning said pre-sealed package within said chamber.

6. The device as defined by claim 5 wherein said lower die assembly includes package support means disposed in the center of said chamber, said pre-sealed package including a plurality of individually sealed packages disposed about said package support means.

7. The device as defined in claim 2 wherein said lower die assembly includes at least one removable insert defining said chamber, said removable insert conforming to said pre-sealed package and being replaceable by other removable inserts conforming to other pre-sealed packages.

8. The device as defined by claim 7 wherein said lower die assembly includes package support means disposed in the center of said chamber, said lower die assembly also including a plurality of removal inserts disposed about said package support means.

9. The device as defined by claim 8 wherein said fluid injection means is operatively associated with said upper die assembly, said fluid injection means being disposed opposite said package support means.

10. The device as defined by claim 9 wherein said fluid injection means includes a fluid injection portion disposed in an operative position in fluid communication with said opening in said one film for injecting said fluid through said opening between said film to entirely surround said seals at a pre-selected fluid pressure.

11. The device as defined by claim 10 wherein said fluid injection means also includes a fluid vacuum portion disposed in an operative position about said opening in said one film for drawing said one film away from the other of said films to permit injection of said fluid through said opening between said films with said fluid injection portion.

12. The device as defined by claim 2 wherein said sensor means is operatively associated with said upper die assembly, said sensor means being disposed in an operative position adjacent one of said two films within the boundary of said continuous seal of said pre-sealed package.

13. The device as defined by claim 12 wherein said sensor means includes a spring plunger mounted on said upper die assembly, said spring plunger being movable to a position contacting said one film when said upper and lower die assemblies seal said marginal edge portion of said pre-sealed package.

14. The device as defined by claim 13 wherein said sensor means also includes indicator means, said indicator means being operatively associated with said spring plunger to provide a perceptible signal in response to movement of said spring plunger after injection of said fluid through said opening between said films with said fluid injection means.

15. The device as defined by claim 1 wherein said fluid injection means includes a fluid injection portion disposed in an operative position in fluid communication with said opening in said one film for injecting said fluid through said opening between said films to entirely surround said seals at a pre-selected fluid pressure.

16. The device as defined by claim 15 wherein said fluid injection means also includes a fluid vacuum portion disposed in an operative position about said opening in said one film for drawing said one film away from the other of said films to permit injection of said fluid through said opening between said films with said fluid injection portion.

17. The device as defined by claim 16 wherein said fluid injection portion comprises a nozzle operatively associated with a source of positive air pressure and said fluid vacuum portion includes a circumferential groove operatively associated with a source of negative air pressure.

18. A method for testing the integrity and strength of a seal, comprising:

providing a pre-sealed package formed of two films joined together to form a continuous seal, said two films extending outwardly of said seal to define a marginal edge portion of said pre-sealed package;

providing an opening outwardly of said continuous seal in one of said two films of said pre-sealed package;

sealing said marginal edge portion in spaced relation to said continuous seal and outwardly of said opening in said one film of said pre-sealed package;

injecting a fluid through said opening in said one film after said marginal edge portion of said pre-sealed package has been sealed; and sensing any passage of said fluid through said continuous seal into said pre-sealed package.

* * * * *